(12) United States Patent
Jones et al.

(10) Patent No.: US 9,568,917 B2
(45) Date of Patent: *Feb. 14, 2017

(54) METHODS AND SYSTEMS FOR AUTOMATED TRANSPORTATION OF ITEMS BETWEEN VARIABLE ENDPOINTS

(71) Applicant: Harvest Automation, Inc., Billerica, MA (US)

(72) Inventors: Joseph L. Jones, Acton, MA (US); Clara Vu, Cambridge, MA (US); Paul E. Sandin, Brookline, NH (US); Charles M. Grinnell, Arlington, MA (US)

(73) Assignee: Harvest Automation, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,548

(22) Filed: Aug. 26, 2015

(65) Prior Publication Data

US 2016/0187886 A1 Jun. 30, 2016

Related U.S. Application Data

(63) Continuation of application No. 13/285,511, filed on Oct. 31, 2011, now Pat. No. 9,147,173.

(51) Int. Cl.
*G05D 1/02* (2006.01)
*G06Q 10/08* (2012.01)
(Continued)

(52) U.S. Cl.
CPC ............. *G05D 1/0214* (2013.01); *G05D 1/00* (2013.01); *G06Q 10/08* (2013.01); *G06Q 50/28* (2013.01); *Y10S 901/01* (2013.01)

(58) Field of Classification Search
CPC ....... G06Q 10/08; G06Q 50/28; Y10S 901/01; G05D 1/0214; G05D 1/00
See application file for complete search history.

(56) References Cited

U.S. PATENT DOCUMENTS 3,821,504 A 6/1974 Shomaker et al.
3,913,758 A 10/1975 Faircloth et al.
(Continued)

FOREIGN PATENT DOCUMENTS

DE 3828447 A1 3/1990
DE 202006004871 U1 6/2006
(Continued)

OTHER PUBLICATIONS

International Search Report and Written Opinon for PCT/US2012/057513, dated Mar. 4, 2013.
(Continued)

*Primary Examiner* — Kim T Nguyen
(74) *Attorney, Agent, or Firm* — Foley Hoag LLP; Rajesh Vallabh

(57) ABSTRACT

An automated system for transporting items between variable endpoints includes a guidance system for identifying the endpoints and at least one autonomous mobile robot interacting with the guidance system for automatically moving items between the endpoints. The at least one robot is configured to (a) collect an item to be transported at a source end point, (b) travel to a destination endpoint utilizing the guidance system to locate the destination endpoint, (c) deliver the item to the destination endpoint, and (d) repeat (a) through (c) for a given set of items. The guidance system is dynamically reconfigurable to identify new endpoints.

30 Claims, 2 Drawing Sheets

(51) Int. Cl.
*G06Q 50/28* (2012.01)
*G05D 1/00* (2006.01)

(56) References Cited

U.S. PATENT DOCUMENTS

| | | | |
|---|---|---|---|
| 4,155,198 A | 5/1979 | Kelley | |
| 4,217,073 A | 8/1980 | Propst | |
| 4,401,236 A | 8/1983 | Germaine | |
| 4,476,651 A | 10/1984 | Drury | |
| 4,522,546 A | 6/1985 | Ringer | |
| 4,700,301 A | 10/1987 | Dyke | |
| 4,749,327 A | 6/1988 | Roda | |
| 4,793,096 A | 12/1988 | Todd, Sr. | |
| 4,854,802 A | 8/1989 | deGroot | |
| 4,869,637 A | 9/1989 | deGroot | |
| 4,994,970 A | 2/1991 | Noji et al. | |
| 5,016,541 A | 5/1991 | Feaster, Jr. | |
| 5,020,964 A | 6/1991 | Hyatt et al. | |
| 5,020,965 A | 6/1991 | Tanaka et al. | |
| 5,046,914 A | 9/1991 | Holland et al. | |
| 5,051,906 A | 9/1991 | Evans, Jr. et al. | |
| 5,081,941 A | 1/1992 | Weeks | |
| 5,085,553 A | 2/1992 | Bouwens et al. | |
| 5,160,235 A | 11/1992 | Bikow | |
| 5,181,818 A | 1/1993 | Tanaka et al. | |
| 5,211,523 A | 5/1993 | Andrada Galan et al. | |
| 5,315,517 A | 5/1994 | Kawase et al. | |
| 5,332,363 A | 7/1994 | Tanaka et al. | |
| 5,348,063 A | 9/1994 | Handleman | |
| 5,348,361 A | 9/1994 | Ilchuk | |
| 5,403,142 A | 4/1995 | Stewart | |
| 5,427,492 A | 6/1995 | Tanaka et al. | |
| 5,496,143 A | 3/1996 | Breyer | |
| 5,688,102 A | 11/1997 | Vieselmeyer | |
| 5,769,589 A | 6/1998 | Lubbers | |
| 5,819,863 A | 10/1998 | Zollinger et al. | |
| 5,842,306 A | 12/1998 | Onosaka et al. | |
| 5,959,423 A | 9/1999 | Nakanishi et al. | |
| 5,974,348 A | 10/1999 | Rocks | |
| 5,988,971 A | 11/1999 | Fossey et al. | |
| 6,164,537 A | 12/2000 | Mariani et al. | |
| 6,186,730 B1 | 2/2001 | Place | |
| 6,212,821 B1 | 4/2001 | Adam et al. | |
| 6,216,631 B1 | 4/2001 | Wissner-Gross | |
| 6,243,987 B1 | 6/2001 | Hessel | |
| 6,255,793 B1 | 7/2001 | Peless et al. | |
| 6,336,051 B1 | 1/2002 | Pangels et al. | |
| 6,347,920 B1 | 2/2002 | Place | |
| 6,389,329 B1 | 5/2002 | Colens | |
| 6,417,641 B2 | 7/2002 | Peless et al. | |
| 6,431,818 B1 | 8/2002 | Place | |
| 6,481,948 B2 | 11/2002 | Spears | |
| 6,496,755 B2 | 12/2002 | Wallach et al. | |
| 6,508,033 B2 | 1/2003 | Hessel et al. | |
| 6,532,404 B2 | 3/2003 | Colens | |
| 6,543,983 B1 | 4/2003 | Felder et al. | |
| 6,611,738 B2 | 8/2003 | Ruffner | |
| 6,638,004 B2 | 10/2003 | Berger et al. | |
| 6,658,324 B2 | 12/2003 | Bancroft et al. | |
| 6,667,592 B2 | 12/2003 | Jacobs et al. | |
| 6,729,836 B2 | 5/2004 | Stingel, III et al. | |
| 6,850,024 B2 | 2/2005 | Peless et al. | |
| 6,854,209 B2 | 2/2005 | Van Horssen et al. | |
| 6,857,493 B2 | 2/2005 | Shupp et al. | |
| 6,915,607 B2 | 7/2005 | Tagawa et al. | |
| 6,950,722 B2 | 9/2005 | Mountz | |
| 6,984,952 B2 | 1/2006 | Peless et al. | |
| 6,988,518 B2 | 1/2006 | Rackers | |
| 6,997,663 B2 | 2/2006 | Siebenga | |
| 7,054,716 B2 | 5/2006 | McKee et al. | |
| 7,069,111 B2 | 6/2006 | Glenn et al. | |
| 7,086,820 B1 | 8/2006 | Blake | |
| 7,137,770 B2 | 11/2006 | Ueda | |
| 7,184,855 B2 | 2/2007 | Stingel, III et al. | |
| 7,198,312 B2 | 4/2007 | Blaho | |
| 7,200,465 B2 | 4/2007 | Stingel, III et al. | |
| 7,261,511 B2 | 8/2007 | Felder et al. | |
| 7,274,167 B2 | 9/2007 | Kim | |
| 7,343,222 B2 | 3/2008 | Solomon | |
| 7,400,108 B2 | 7/2008 | Minor et al. | |
| 7,506,472 B2 | 3/2009 | Leyns et al. | |
| 7,559,736 B1 | 7/2009 | Mohan | |
| 7,579,803 B2 | 8/2009 | Jones et al. | |
| 7,610,122 B2 | 10/2009 | Anderson | |
| 7,613,544 B2 | 11/2009 | Park et al. | |
| 9,147,173 B2 * | 9/2015 | Jones | G06Q 10/08 |
| 2001/0008112 A1 | 7/2001 | Opitz | |
| 2002/0120364 A1 | 8/2002 | Colens | |
| 2002/0146306 A1 | 10/2002 | Morrell | |
| 2002/0182046 A1 | 12/2002 | Schempf et al. | |
| 2003/0030398 A1 | 2/2003 | Jacobs et al. | |
| 2003/0118487 A1 | 6/2003 | Pressman et al. | |
| 2003/0165373 A1 | 9/2003 | Felder et al. | |
| 2003/0199944 A1 | 10/2003 | Chapin et al. | |
| 2004/0139692 A1 | 7/2004 | Jacobsen et al. | |
| 2005/0090961 A1 | 4/2005 | Bonk et al. | |
| 2005/0091953 A1 | 5/2005 | Turner et al. | |
| 2005/0126144 A1 | 6/2005 | Koselka et al. | |
| 2005/0135912 A1 | 6/2005 | Schempf et al. | |
| 2005/0135913 A1 | 6/2005 | Visser | |
| 2005/0238465 A1 | 10/2005 | Razumov | |
| 2005/0246056 A1 | 11/2005 | Marks et al. | |
| 2005/0254924 A1 | 11/2005 | Swetman et al. | |
| 2005/0254927 A1 | 11/2005 | Swetman et al. | |
| 2005/0268987 A1 | 12/2005 | Rackers | |
| 2006/0045679 A1 | 3/2006 | Ostendorff | |
| 2006/0072988 A1 | 4/2006 | Hariki et al. | |
| 2006/0095169 A1 | 5/2006 | Minor et al. | |
| 2006/0120834 A1 | 6/2006 | Pressman et al. | |
| 2006/0213167 A1 | 9/2006 | Koselka et al. | |
| 2006/0221769 A1 | 10/2006 | Van Loenen et al. | |
| 2006/0257236 A1 | 11/2006 | Stingel et al. | |
| 2006/0293810 A1 | 12/2006 | Nakamoto | |
| 2007/0017181 A1 | 1/2007 | Jacobsen et al. | |
| 2007/0042803 A1 | 2/2007 | Anderson | |
| 2007/0129849 A1 * | 6/2007 | Zini | G05B 19/41895 700/258 |
| 2007/0140821 A1 | 6/2007 | Garon et al. | |
| 2007/0152619 A1 | 7/2007 | Sugiyama et al. | |
| 2007/0219720 A1 | 9/2007 | Trepagnier et al. | |
| 2008/0046130 A1 | 2/2008 | Faivre et al. | |
| 2008/0131254 A1 | 6/2008 | Cope et al. | |
| 2008/0279663 A1 | 11/2008 | Alexander | |
| 2009/0012667 A1 | 1/2009 | Matsumoto et al. | |
| 2009/0021351 A1 | 1/2009 | Beniyama et al. | |
| 2009/0054222 A1 | 2/2009 | Zhang et al. | |
| 2009/0148034 A1 | 6/2009 | Higaki et al. | |
| 2009/0175709 A1 | 7/2009 | Okabe et al. | |
| 2009/0214324 A1 | 8/2009 | Grinnell et al. | |
| 2009/0254217 A1 | 10/2009 | Pack et al. | |
| 2011/0025454 A1 | 2/2011 | Pomerantz et al. | |
| 2011/0301757 A1 | 12/2011 | Jones et al. | |
| 2012/0114187 A1 | 5/2012 | Duarte | |
| 2013/0110281 A1 | 5/2013 | Jones et al. | |
| 2013/0110341 A1 | 5/2013 | Jones et al. | |
| 2013/0325159 A1 | 12/2013 | Kilibarda et al. | |

FOREIGN PATENT DOCUMENTS

| | | |
|---|---|---|
| EP | 0195191 A1 | 9/1986 |
| EP | 0774702 A2 | 5/1997 |
| JP | S61204714 A | 9/1986 |
| JP | 03-285602 A | 12/1991 |
| JP | 07-065908 | 3/1995 |
| JP | 11-077579 | 3/1999 |
| JP | 2002-321179 A | 11/2002 |
| JP | 2006-346767 A | 12/2006 |
| JP | 2007-508667 A | 4/2007 |
| JP | 2009-511288 A | 3/2009 |
| WO | 94/22094 A1 | 9/1994 |

(56) References Cited

FOREIGN PATENT DOCUMENTS

| WO | 99/059042 A1 | 11/1999 |
| WO | 2007/004551 A1 | 1/2007 |
| WO | 2009/024246 A1 | 2/2009 |

OTHER PUBLICATIONS

SICK LMS 200 Technical Description, Jun. 2003 [online] [retrieved Sep. 11, 2014]. Retrieved from: http://www.sick-automation.ru/images/File/pdf/LMS%20Technicai%20Description.pdf.

* cited by examiner

SLAM

Beacons

Markers + local beacons

Ad hoc route markers

METHODS AND SYSTEMS FOR AUTOMATED TRANSPORTATION OF ITEMS BETWEEN VARIABLE ENDPOINTS

RELATED APPLICATION

This application is a continuation of U.S. patent application Ser. No. 13/285,511 filed Oct. 31, 2011 entitled METHODS AND SYSTEMS FOR AUTOMATED TRANSPORTATION OF ITEMS BETWEEN VARIABLE ENDPOINTS, which is hereby incorporated by reference.

BACKGROUND

The present application relates generally to transportation of items and, more particularly, to automated methods and systems for transporting items between variable endpoints.

BRIEF SUMMARY

An automated system for transporting items between variable endpoints in accordance with one or more embodiments includes a guidance system for identifying the endpoints and at least one autonomous mobile robot interacting with the guidance system for automatically moving items between the endpoints. The at least one robot is configured to (a) collect an item to be transported at a source endpoint, (b) travel to a destination endpoint utilizing the guidance system to locate the destination endpoint, (c) deliver the item to the destination endpoint, and (d) repeat (a) through (c) for a given set of items. The guidance system is dynamically reconfigurable to identify new endpoints.

A method of transporting items between endpoints in accordance with one or more embodiments includes the steps of: establishing a source endpoint and a destination endpoint; activating at least one autonomous mobile robot to automatically (a) travel to a source endpoint, (b) collect an item to be transported, (c) travel to the destination endpoint with the item, (d) deliver the item to the destination endpoint, and (e) repeat (a) through (d) for a given set of items; and changing the location of one or both of the source and destination endpoints, wherein the at least one robot dynamically adapts to changed endpoints to repeat steps (a)-(e).

BRIEF DESCRIPTION OF THE DRAWINGS

Like or identical reference numbers are used to identify common or similar elements.

DETAILED DESCRIPTION

Figure 1:
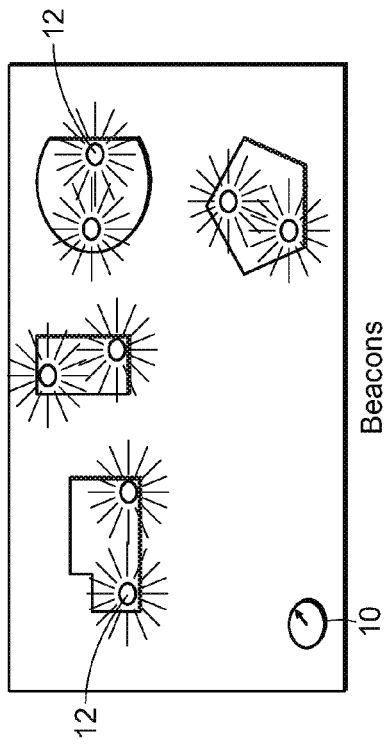
FIG. 1 is a simplified diagram illustrating use of a navigation system by robots to locate endpoints in accordance with one or more embodiments.

Various embodiments disclosed herein are generally directed to material handling methods and systems. In particular, automated methods and systems are provided for transporting items between variable endpoints. An automated system in accordance with one or more embodiments includes a guidance system for identifying the endpoints and one or more autonomous mobile robots or platforms interacting with the guidance system for automatically moving items between the endpoints. Each robot is configured to (a) collect an item to be transported at a source end point, (b) travel to a destination endpoint utilizing the guidance system to locate the destination endpoint, (c) deliver the item to the destination endpoint, and (d) repeat (a) through (c) for a given set of items. The guidance system is dynamically reconfigurable to identify new endpoints. The guidance system can mark a complete route or just the end points of a route for the robot.

Advantages of automated systems in accordance with various embodiments can include flexibility, minimal infrastructure, no programming needed, and adaptability to unstructured environments.

The automated system can be used across broad market segments. Automated systems in accordance with various embodiments can also be operated under a variety of conditions including the following. (1) The terrain is rough, e.g., outdoor environments where conventional material handling systems are difficult to use. (2) The surface over which material must travel cannot support heavy weight, e.g., the weight of trucks, forklifts or other mechanized solutions. (3) The workspace is unstructured and dynamic. In addition to most outdoor spaces, this description includes indoor spaces, where the workflow changes frequently or large objects (e.g., pallets) are often repositioned. (4) The pickup point or the drop off point or both, change during operations. (5) Obstruction of the workspace created by a fixed conveyor system is unacceptable. (6) Material must be moved long distances and system utilization is low to moderate. (7) The initial cost of the material-handling system is required to be low.

Platform

The form of an autonomous robot in a particular implementation can vary depending on payload and environmental factors. By way of example, if the robot operates on a flat surface inside a building, it can use a two-wheeled, differential drive mobility system. If it operates on a rough terrain, e.g., a construction site, it may use a tracked platform able to traverse inclines and loose soil.

Behaviors

The autonomous robots move items from a source or load point to a sink or unload point. The robot's basic behaviors depend on its relationship to the source and sink points and whether it is carrying a load. The following table describes some exemplary behaviors triggered by position and load status:

| Position | Load status | Behavior |
| --- | --- | --- |
| Source | Loaded | Move toward sink |
| | Empty | Stop, wait to be loaded |
| Intermediate | [Don't care] | Proceed along the route until an endpoint is reached |
| Sink | Loaded | Stop, wait to be unloaded |
| | Empty | Move toward source |

Beyond the basic behaviors outlined in the table, autonomous robots in accordance with various embodiments may have additional behaviors that are activated at intermediate positions along the route. These behaviors deal with obstacles (including other robots) discovered along the way.

Queuing

In accordance with one or more embodiments, each autonomous robot includes a sensor or other mechanism for detecting the presence of other nearby robots. If a robot encounters an obstacle along its route, it either stops or attempts to go around the obstacle. However, if the obstacle is another robot then the robot stops, thus forming a queue. Queues develop near endpoints of the route when robots wait to be loaded or unloaded.

Avoidance

If a robot encounters an obstacle along a route that is not another robot, the robot may attempt to continue toward its destination by skirting the object. The robot can include a wide-angle range sensor (see below) to provide it knowledge of obstructions on and near its route. This may make it possible for the robot to depart from a direct route and then return once the obstacle has been passed. However, whether the robot attempts to go around an obstacle or wait for the obstacle to move is a user choice. In generally uncluttered environments, it will be safe for a robot to search for an alternate route by itself. In more complex environments—especially those with non-geometric hazards—finding a safe alternative to the marked route may not be safe. Thus the user can instruct the robot whether to wait when the route is blocked.

Sensing

Route: In accordance with one or more embodiments, robots can navigate between source and sink using a guidance system such as a beacon marking the route's endpoints or a continuous route marker.

The beacon can be active (e.g., an IR emitter) or passive (e.g., a pattern recognized by an onboard camera). If a beacon is used, each robot should maintain a line of sight between the beacons, i.e., both beacons should be visible to the robot at nearly all times. The robot moves directly from one beacon toward the other unless an obstacle intervenes as described above.

The beacons can establish a coordinate system, where the beacon is the origin of the system. Angular encoding can be used to specify the axes of the coordinate system. The coordinate system enables robots to queue along a particular ray whose origin is the beacon. Angle encoding can also enable other useful properties.

A route marker indicating a robot's path may be used in situations where either a line of sight between beacons does not exist or traveling in a straight path between beacons is not desired. For example, a route marker might enable a robot to avoid a ditch at a construction site.

The route marker can be a worker-positioned tape or line, e.g., comprising a retro-reflective material that enables the robot to acquire it at a distance. The tape or line need not be permanently installed on the floor.

The robot can illuminate the tape or line using, e.g., conventional IR LEDs. In one or more embodiments, the robot detects the tape or line using a position-sensitive detector composed of discrete components (i.e., not a camera) to servo on the tape or line. The detector measures the degree of retro-reflectivity in view to eliminate false positives.

In some embodiments, the robots servo on the line directly. In other embodiments, the robots can servo at any selected offset with respect to the line. Offset servoing enables two important properties. When placing the line to mark the robot's path, workers need not allow space between line and objects. Any time the robot finds its path partially blocked by an object, it will increase its offset from the line so that it can follow the line without colliding with the object. A second feature enabled by offset following allows two robots that meet while traveling along the line in opposite directions to avoid collision. When the robots determine that a collision is imminent, each can offset its position relative to the line. They can thus pass without obstructing each other.

Obstacles: In order to move safely along its route, each robot is equipped with a sensor such as a wide-angle range sensor.

Robot: Each robot can be equipped with a sensor able to distinguish between obstacles and other robots at relatively short range. By way of example, this sensor can be an active IR emitter on one robot that is detected by a receiver on the other robot. The components of this system on the two robots can be arranged such that the following robot detects the robot in front only when the two are physically close.

Load: To allow autonomous operation, each robot can further include a sensor capable of detecting when the robot carries a load. The robot uses the output from this sensor to decide whether to wait at an end point or traverse to the opposite endpoint (see table above).

Manipulation: Robots may optionally include a mechanism enabling a robot to load and unload itself.

User interface: The interface for each robot is preferably simple and intuitive such that the workers themselves are able to setup material handling system wherever necessary. In one or more embodiments, no programming is required.

Implementation Examples:

Automated material handling systems can have a wide range of applications, including, by way of example, the following:

| Application | Current Practice | Automated Solution | System Advantages |
|---|---|---|---|
| Produce picker conveyor | Laborers in the field pick produce and place it in a basket or sling. Periodically, they carry the produce from the field to a truck or other collection point. | Workers establish routes for one or more autonomous robots. The robots travel along crop rows and stop at the collection point. Periodically a robot arrives at the place where a worker is picking. The worker places just-picked produce on the robot then continues picking. | The automated system eliminates the time workers spend in transit and eliminates the need to carry heavy loads. |
| Truck Loading | Trucks back up to the loading dock. Workers move items from a warehouse or other | Robots move products into the trucks. A worker in the loading area places items onto a | The automated system reduces the time and number of workers needed to load a truck. |

-continued

| Application | Current Practice | Automated Solution | System Advantages |
|---|---|---|---|
| | facility into the loading area. There the items may be staged into orders or loaded directly onto the trucks. In either case, workers make a large number of back and forth trips to move items into trucks. | robot and dispatches it to the correct truck. A worker in the truck packs the truck. | Reduced loading time translates directly into cost savings especially in situations where customers must pay the trucking company for idle time while trucks are loaded. |
| Baggage Handling | At small airports ticket agents collect luggage onto a tray or pull cart as passengers check in. Eventually, a batch of bags is hauled out to the airplane. Loading cannot begin until the batch arrives. | Ticket agents place luggage on robots queued in the ticket area. Bags then move immediately to the aircraft loading area. | The automated system enables more timely departures by reducing the loading bottleneck. It also makes more efficient use of airline personnel. Bags can be loaded onto the airplane as passengers arrive and need not be loaded en mass just before takeoff. |
| Contract Manufacturing | Work is typically performed on the subassemblies of a product at several different assembly stations. The particular stations involved and the flow of work pieces among them may change with each contract job. Because workflow is frequently scrambled, fixed conveyor systems cannot be used. | When a new contract job begins routes are established between the various stations where the work will be done. The robots automatically carry subassemblies from each station to the next. | The automated system improves the efficiency of low-volume manufacturing by providing the benefits of automatic conveyor systems where they cannot now be used. |
| Stocking shelves in stores | Workers place merchandise on stocking carts then push the carts to the correct area of the store. Popular items or items that do not stack well may require many trips. | Workers mark the start and end points of a route. A worker in the store's storage area loads robots with the proper items. After the robots have delivered their cargo to the proper areas (using an optional AutoOffLoad feature) workers can stock the shelves. | The automated system eliminates multiple round trips. Workers need set up a route only once, then the robot will follow it however many times necessary. |
| Construction site material delivery | Obstructions or soft surfaces at construction sites often prevent trucks from delivering material to the place where it will be used. In these cases workers may need to make repeated trips to carry or cart item from the delivery point to the work area. | Workers set up a route for robots to follow. A worker at one end of the route loads robots with material, and a worker at the work point unloads them. | The automated system saves time by relieving workers of the need to manually cart material from the delivery truck to the work point. |
| Landscaping site material delivery | Trucks filled with plants and other items arrive at a landscaping site. Because trucks cannot drive on the lawn all materials must be carried or hand-carted to the places where they will be installed. | A route is established with drop off points indicated. The robots are loaded at the truck then automatically carry plants to the proper point and drop them off. | The automated system reduces the time needed to distribute plants at landscaping sites. |
| Debris removal | Workers tear out walls, fixtures, and other items in preparation for new construction. The work area becomes filled with debris. Carts are brought in, loaded with | Robots continuously carry debris away from the work area as it is generated. | The automated system eliminates the time workers spend in transit hauling debris. Because the work area never becomes cluttered with debris demolition |

| Application | Current Practice | Automated Solution | System Advantages |
|---|---|---|---|
| | debris, and it is moved to a dumpster, usually located outdoors. | | proceeds more efficiently. |
| Consumer leaf collection | Removing fallen leaves typically involves raking the leaves into a pile, placing the pile on a wheelbarrow or tarp, then moving the wheelbarrow or tarp to a collection point. | The homeowner places a beacon at the point where the leaves are to be deposited. An automated robot repeatedly travels between the leaf deposit point and the place where the owner is raking. The robot dumps the leaves using an optional dumping mechanism. | The automated system makes raking faster and easier. |

FIGS. 1-4 illustrate various possible guidance systems that can be used by robots to locate endpoints in accordance with one or more embodiments. In FIG. 1, the guidance system comprises a SLAM navigation system that gives robots 10 a global coordinate frame. In this formulation destinations are coordinates, thus no physical markers are necessary.

Figure 2:
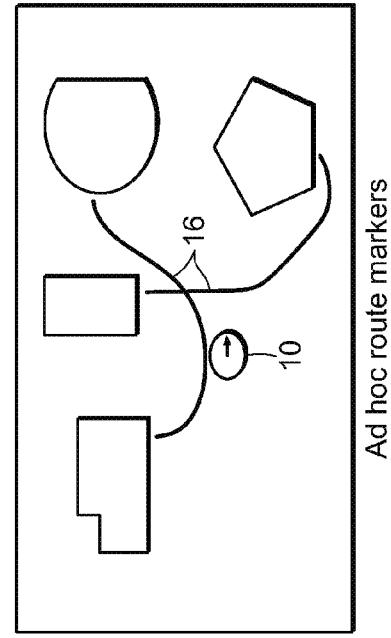
FIG. 2 is a simplified diagram illustrating use of beacons or passive tags by robots to locate endpoints in accordance with one or more embodiments.

As shown in FIG. 2, beacons or passive tags 12 visible from a large distance mark each possible destination. This method allows the robot to reach any inbox or outbox without the need of a global frame.

Figure 3:
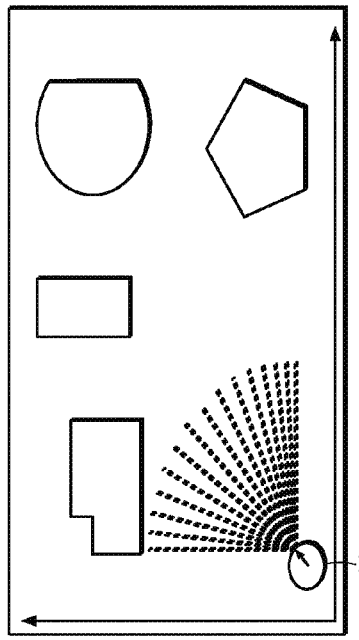
FIG. 3 is a simplified diagram illustrating use of beacons and markers by robots to locate endpoints in accordance with one or more embodiments.

FIG. 3 shows a guidance system combining shorter-range beacons 12 with "highways" established by markers 14 attached to the floor to give the robots a rough global frame. This arrangement simplifies range sensor requirements compared to SLAM.

Figure 4:
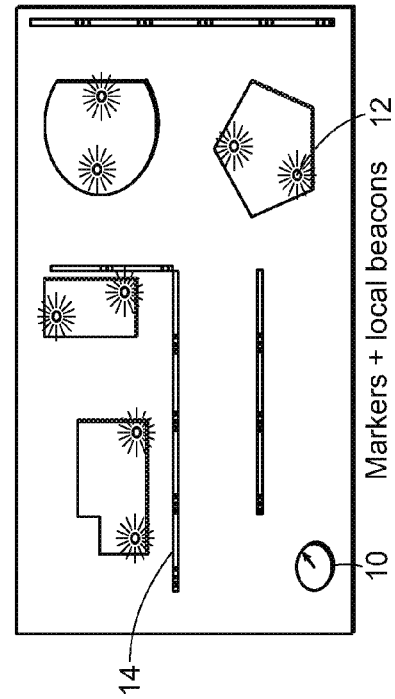
FIG. 4 is a simplified diagram illustrating use of markers by robots to locate endpoints in accordance with one or more embodiments.

In FIG. 4, robots are guided by marker 16 laid on the ground, in some cases temporarily.

Figure 5:
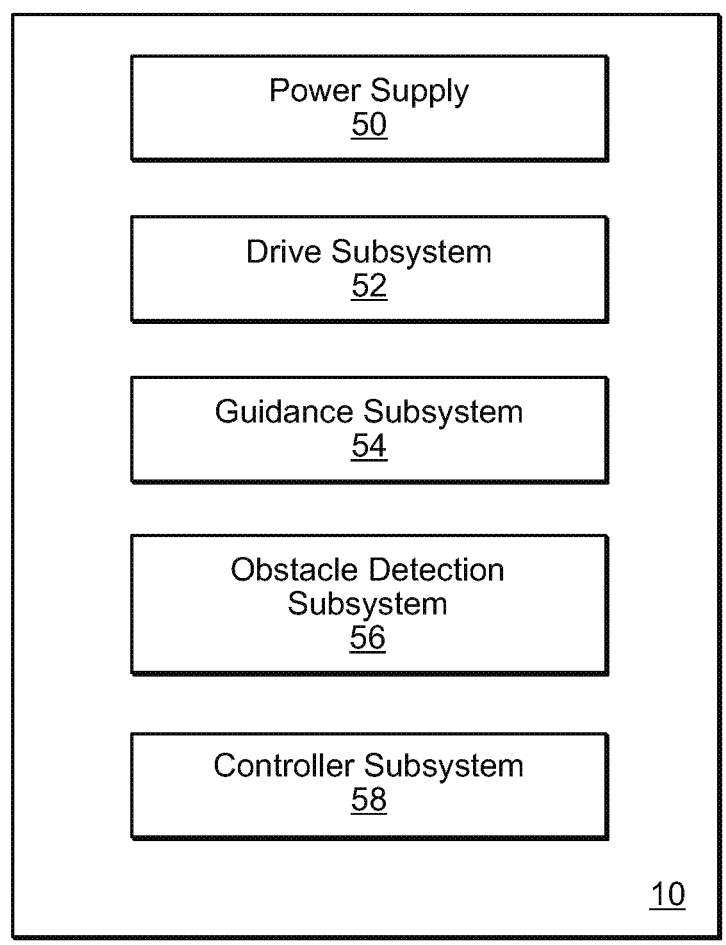
FIG. 5 is a block diagram of various components of an exemplary robot in accordance with one or more embodiments.

FIG. 5 is a block diagram of various components of an exemplary robot 10. The robot 10 includes a chassis and a drive subsystem 52 for maneuvering the chassis. It further includes a guidance subsystem 54 on the chassis for interacting with the guidance system. In some embodiments, the subsystem 54 includes one or more marker detecting sensors able to detect the position of a marker such as a retro-reflective tape laid on the ground. By way of example, the marker detecting sensors can each comprise a photodiode-based sensor and one or more radiation sources (e.g., LEDs) to servo on the marker.

In some embodiments, the guidance subsystem 54 comprises a plurality of beacons, each having a radio frequency or other (e.g., infrared) beacon transmitter. In this case, the guidance subsystem 54 includes one or more sensors for detecting signals from beacons.

The robot includes an obstacle detection subsystem 56 for detecting other robots and obstacles.

The robot includes a microprocessor-based controller subsystem 58 for controlling operation of the robot in performing programmed behaviors. A power supply 50 for all the subsystems can include one or more rechargeable batteries.

In some embodiments, the drive subsystem 52 takes the form of a differential drive comprising two coaxial wheels and a roller for balance. The wheels are driven together or independently by one or more motors and a drive train controlled by the controller subsystem 58.

The obstacle detection subsystem 56 can include one or more range sensors to detect other robots and obstacles. In some embodiments, the range sensor is a wide-angle (120 degree) range sensor. Raw range sensor data (in the form of a list of angle and range readings) supplied by the sensor is processed by a computer processor (e.g., a processor in the controller subsystem 58) to return the position of other robots and obstacles.

The controller subsystem 58 is configured (e.g., programmed) to perform various functions, including transporting items between endpoints. The controller subsystem 58 is responsive to the output of guidance subsystem 54 and the output of obstacle detection subsystem 56. The controller subsystem 58 controls the drive subsystem 52 to maneuver the robot to prescribed endpoint locations.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The processes the robots are programmed to perform as described above may be implemented in software, hardware, firmware, or any combination thereof. The processes are preferably implemented in one or more computer programs executing on the programmable controller subsystem, which includes a processor, a storage medium readable by the processor (including, e.g., volatile and non-volatile memory and/or storage elements), and input and output devices. Each computer program can be a set of instructions (program code) in a code module resident in a random access memory. Until required, the set of instructions may be stored in another computer memory (e.g., in a hard disk drive, or in a removable memory such as an optical disk, external hard drive, memory card, or flash drive) or stored on another computer system and downloaded via the Internet or other network.

Accordingly, the foregoing description and attached drawings are by way of example only, and are not intended to be limiting.

What is claimed is:

1. An automated material handling system comprising:
a reconfigurable guidance system configured to dynamically identify a changeable source endpoint and a changeable destination endpoint; and
at least one autonomous mobile robot interacting with the guidance system for automatically moving items between the dynamically identified changeable source endpoint and the dynamically identified changeable destination endpoint;
wherein the at least one autonomous mobile robot is configured to automatically and dynamically adapt to an identified dynamic change of the dynamically identified changeable source endpoint or the dynamically identified changeable destination endpoint, which identified dynamic change to the dynamically identified changeable source endpoint or the dynamically identified changeable destination endpoint is effected while the at least one autonomous mobile robot is in autonomous operation.

2. The automated material handling system of claim 1, wherein the at least one autonomous mobile robot is configured to:
collect an item to be transported at a dynamically identified source endpoint;
travel to a dynamically identified destination endpoint utilizing the reconfigurable guidance system to locate the dynamically identified destination endpoint; and
deliver the item to the dynamically identified destination endpoint.

3. The automated material handling system of claim 1, wherein the reconfigurable guidance system defines a route to the dynamically identified changeable source endpoint and the dynamically identified changeable destination endpoint, comprising route markers that are detectable by the at least one autonomous mobile robot to guide the at least one autonomous mobile robot to the dynamically identified changeable source endpoint and the dynamically identified changeable destination endpoint.

4. The automated material handling system of claim 3, wherein the at least one autonomous mobile robot is configured to servo on each marker at an offset position relative to the marker, wherein the offset position can be automatically changed to avoid colliding with another robot servoing on the marker.

5. The automated material handling system of claim 1, wherein the reconfigurable guidance system comprises a plurality of beacons, each beacon identifying a different endpoint.

6. The automated material handling system of claim 1, wherein the reconfigurable guidance system comprises a plurality of beacons, each beacon identifying a series of intermediate locations leading to an endpoint.

7. The automated material handling system of claim 1, wherein the at least one autonomous mobile robot includes a range sensor configured to detect obstacles or other robots in its travel path.

8. The automated material handling system of claim 7, wherein the at least one autonomous mobile robot is configured to change its travel path to avoid the obstacle or other robot blocking its travel path or to wait until the travel path is unblocked.

9. The automated material handling system of claim 7, wherein the range sensor is configured to distinguish between the detected obstacles and the detected robots.

10. The automated material handling system of claim 1, wherein the at least one autonomous mobile robot includes a plurality of robots, each robot being configured to detect a presence of other robots and form a queue when another robot is detected in its travel path at an endpoint.

11. The automated material handling system of claim 1, wherein the at least one autonomous mobile robot includes a mechanism to load or unload the items at the dynamically identified changeable source endpoint and the dynamically identified changeable destination endpoint.

12. The automated material handling system of claim 1, wherein the at least one autonomous mobile robot is configured for manual loading and unloading of items to and from the at least one autonomous mobile robot.

13. The automated material handling system of claim 1, wherein each of the at least one autonomous mobile robot comprises:
a chassis;
an apparatus on the chassis for carrying an item;
a drive subsystem for maneuvering the chassis;
a subsystem on the chassis for interacting with the reconfigurable guidance system;
an obstacle detection subsystem on the chassis; and
a controller on the chassis responsive to the subsystem for interacting with the reconfigurable guidance system and the obstacle detection subsystem and being configured to control the drive subsystem to travel between the dynamically identified changeable source endpoint and the dynamically identified changeable destination endpoint.

14. An automated material handling system comprising:
a reconfigurable guidance system configured to dynamically identify a changeable source endpoint and a changeable destination endpoint;
an undeterministic travel surface along which the changeable source endpoint and the changeable destination endpoint are located; and
at least one autonomous mobile robot configured to
traverse the undeterministic travel surface, and
interact with the guidance system for automatically moving items between the dynamically identified changeable source endpoint and the dynamically identified changeable destination endpoint along the undeterministic travel surface;
wherein the at least one autonomous mobile robot is configured so that the undeterministic travel surface provides holonomic selectable paths for the at least one autonomous mobile robot substantially everywhere on the undeterministic travel surface, each of the paths being freely selectable by the at least one autonomous mobile robot for traversing along the undeterministic travel surface upon identification of a dynamic change of one or more of the changeable source endpoint and the changeable destination endpoint, where the identification of the dynamic change of one or more of the changeable source endpoint and the changeable destination endpoint is effected while the at least one autonomous mobile robot is in autonomous operation.

15. The automated material handling system of claim 14, wherein the reconfigurable guidance system is configured to change a location of one or more of the changeable source endpoint and the changeable destination endpoint and the at least one autonomous mobile robot is configured to dynamically adapt to the changed locations.

16. The automated material handling system of claim 15, wherein the at least one autonomous mobile robot is configured to dynamically adapt to the changed locations free from operation intervention.

17. The automated material handling system of claim 15, wherein the reconfigurable guidance system defines a route to the dynamically identified changeable source endpoint and the dynamically identified changeable destination endpoint, comprising route markers that are detectable by the at least one autonomous mobile robot to guide the at least one autonomous mobile robot to the dynamically identified changeable source endpoint and the dynamically identified changeable destination endpoint.

18. The automated material handling system of claim 17, wherein each marker comprises a retro-reflective material and each of the at least one autonomous mobile robot includes a marker detecting sensor for detecting the retro-reflective material.

19. The automated material handling system of claim 15, wherein the reconfigurable guidance system comprises a plurality of beacons, each beacon identifying a different endpoint.

20. The automated material handling system of claim 15, wherein the reconfigurable guidance system comprises a plurality of beacons, each beacon identifying a series of intermediate locations leading to an endpoint.

21. A method for automated material handling using an autonomous mobile robot, said method implemented in a microprocessor-based controller of the autonomous mobile robot comprising the steps of:
 (a) controlling the autonomous mobile robot to interact with a reconfigurable guidance system that can dynamically identify a changeable source endpoint and a changeable destination endpoint;
 (b) controlling the autonomous mobile robot to automatically move items between the dynamically identified changeable source endpoint and the dynamically identified changeable destination endpoint; and
 (c) controlling the autonomous mobile robot to automatically and dynamically adapt to an identified dynamic change of the dynamically identified changeable source endpoint or the dynamically identified changeable destination endpoint, which identified dynamic change to the dynamically identified changeable source endpoint or the dynamically identified changeable destination endpoint is effected while the autonomous mobile robot is in autonomous operation.

22. The method of claim 21, wherein step (b) comprises:
 controlling the autonomous mobile robot to collect an item to be transported at a dynamically identified source endpoint;
 controlling the autonomous mobile robot to travel to a dynamically identified destination endpoint utilizing the reconfigurable guidance system to locate the dynamically identified destination endpoint; and
 controlling the autonomous mobile robot to deliver the item to the dynamically identified destination endpoint.

23. The method of claim 21, wherein the reconfigurable guidance system defines a route to the dynamically identified changeable source endpoint and the dynamically identified changeable destination endpoint, comprising route markers that are detectable by the autonomous mobile robot to guide the autonomous mobile robot to the dynamically identified changeable source endpoint and the dynamically identified changeable destination endpoint.

24. The method of claim 23, further comprising controlling the autonomous mobile robot to servo on each marker at an offset position relative to the marker, wherein the offset position can be automatically changed to avoid colliding with another robot servoing on the marker.

25. The method of claim 21, wherein the reconfigurable guidance system comprises a plurality of beacons, each beacon identifying a different endpoint.

26. The method of claim 21, wherein the reconfigurable guidance system comprises a plurality of beacons, each beacon identifying a series of intermediate locations leading to an endpoint.

27. The method of claim 21, further comprising controlling the autonomous mobile robot to detect obstacles or other robots in its travel path.

28. The method of claim 27, further comprising controlling the autonomous mobile robot to change its travel path to avoid the obstacle or other robot blocking its travel path or to wait until the travel path is unblocked.

29. The method of claim 21, further comprising controlling the autonomous mobile robot to detect a presence of other robots and form a queue when another robot is detected in its travel path at an endpoint.

30. The method of claim 21, further comprising controlling the autonomous mobile robot to load or unload the items at the dynamically identified changeable source endpoint and the dynamically identified changeable destination endpoint.

* * * * *